Figure 1:
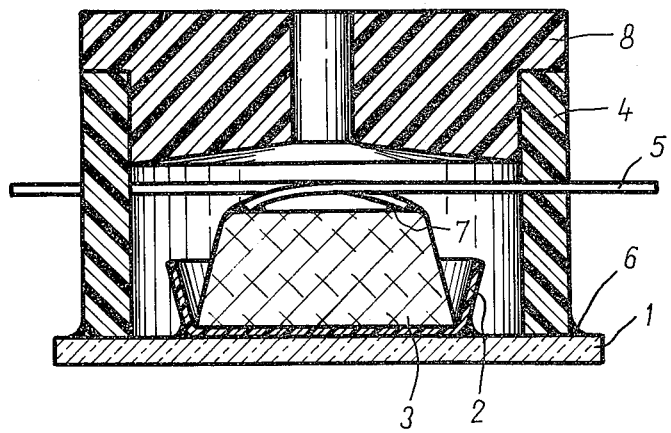

United States Patent [19]
Wichterle

[11] 3,896,806
[45] July 29, 1975

[54] IMPLANT FOR DIRECTED INFUSION OF BIOLOGICALLY ACTIVE SUBSTANCES
[75] Inventor: Otto Wichterle, Prague, Czechoslovakia
[73] Assignee: Ceskoslovenska akademie ved, Prague, Czechoslovakia
[22] Filed: Dec. 21, 1971
[21] Appl. No.: 210,420

[30] Foreign Application Priority Data
Jan. 8, 1971  Czechoslovakia ............... 114-71

[52] U.S. Cl. ........................... 128/260; 3/1; 424/19
[51] Int. Cl............................................. A61m 31/00
[58] Field of Search ........... 128/260, 261, 172, 419; 424/14, 16, 19, 81; 3/1

[56] References Cited
UNITED STATES PATENTS
3,220,960  11/1965  Wichterle ............................. 3/1 X
3,247,066  4/1966  Hilosovich ........................... 424/19
3,276,448  10/1966  Kronenthal ........................... 3/1 X
3,313,289  4/1967  Kapral ................................. 3/1 X
3,466,131  9/1969  Arcudi ............................. 128/260 X
3,485,244  12/1969  Rosen ................................. 128/260
3,551,556  12/1970  Klihent et al. .................. 128/260 X
3,594,469  7/1971  Whitehead et al................ 424/19 X
3,608,549  9/1971  Merrill ............................... 128/260
3,765,414  10/1973  Arlen ................................. 128/260

Primary Examiner—Richard A. Gaudet
Assistant Examiner—Lee S. Cohen
Attorney, Agent, or Firm—Murray Schaffer

[57] ABSTRACT

The invention relates to an implant for directed infusion of active substances, which implant consists of a hollow body with one wall formed by a thin permeable membrane and with a chamber inside the body, which chamber is connected at least by one channel with the outside space. This enables practically unidirectional diffusion of the active substance directly to the affected tissue and to maintain or arbitrarily change the concentration and type of the active agent.

30 Claims, 2 Drawing Figures

PATENTED JUL 29 1975　　　　　3,896,806

INVENTOR
OTTO WICHTERLE
BY
ATTORNEY

IMPLANT FOR DIRECTED INFUSION OF BIOLOGICALLY ACTIVE SUBSTANCES

BACKGROUND OF THE INVENTION

Various methods of directing drugs into the location of disorder were recommended in the medical treatment of non-operable tumor diseases. One of the methods consists in the operative placement of an implant containing an active substance, closely to the tumor tissue. The active substance, is released by slow diffusion, acts, at the same time, in high concentrations at the spot where the implant has been surgically introduced, and causes practically no damage to the other parts of the organism. This method, evidently, does not make possible controlled dosing of the active agent and the release is spontaneously slowed down as the content of the agent in implant decreases.

SUMMARY OF THE INVENTION AND DESCRIPTION OF THE PREFERRED EMBODIMENTS

The aforesaid disadvantages are overcome with the implant for directed infusion of biologically active substances according to the invention. This implant consists of a hollow body with one wall formed by thin-walled permeable membrane, which edges are anchored into the side walls of the body, and other walls of the body which are thick, wherein inside the body is a chamber connected by at least one channel with the outside.

The implant is advantageously made from an inert material swelling in water but insoluble therein. Hydrophilic material having the linear swelling capacity in the range from 10 to 45% may be used as the aforesaid inert material swelling in water. Copolymers of glycol methacrylate or acrylate, which contain up to 2 wt. % of glycol dimethacrylate (respectively diacrylate) and up to 3 wt. % of methacrylic acid (respectively acrylic acid) are preferably used. This material may be replaced by other hydrophilic materials with similar properties based, for example, on acrylamide, N-substituted or N,N-disubstituted acrylamides, or their copolymers.

Glycol in the term "glycol methacrylate", respectively "glycol acrylate", has to be understood not only as simple ethyleneglycol, but also as diethyleneglycol, triethyleneglycol, propyleneglycol, butyleneglycol, etc. and their mixtures, i.e. as any kind of hydrophilic glycols.

If the body of the implant is made from a hydrophobic material, it is advantageous to cover the surface with a hydrophilic surface layer which is well tolerated by the organism. For example, the surface of poly(methyl methacrylate) can be covered by a layer of cross-linked poly(methacrylic acid).

The type of the membrane is preferably adapted to the character of the diffusing active substance. Usually, the membrane is made from the same or similar hydrophilic physiologically inert material, only more hydrophilic than the other parts of the implant. However, the hydrophilic character of the membrane can be suppressed, if diffusion of hydrophobic agents is considered and the membrane may be formed even from a material different from the implant body. The membrane can be advantageously reinforced with a fabric. To prepare the implant according to the invention, the membrane is first made from the hydrophilic gel and shaped at temperatures above the softening point to the form of a cup and this shape is fixed by cooling. The cup is then fixed to the bottom of the mold. A fusible and/or soluble core having the required shape of the implant chamber is put into the cup and at least one wire or stick is introduced into the mold at the same time to create the channels connecting the chamber with the outside. The mold is charged with a monomer mixture which is allowed to polymerize. The membrane may be preferably reinforced, for example with a fabric.

If the material of the implant body and the membrane is the same, the process can be simplified in the following manner: The cup is shaped from a textile material and is applied to the bottom of the mold with a fusible and/or soluble core, which has the required shape of the implant chamber, by means of at least one wire or stick serving for the formation of the required channels connecting the chamber with the outside. The mold is then charged with a monomer mixture, deaerated by applying of vacuum and the monomer mixture is allowed to polymerize.

The mold for carrying out the aforegiven methods is formed, according to the invention, by a vessel which has at least one wire or stick pushed through its walls and can be closed with a detachable lid having an opening. The cup shaped membrane formed from the dried hydrogel and advantageously reinforced with a fabric, or a cup-shaped textile, respectively, is placed inside the vessel at the bottom, which may be preferably detachable. The core made of a fusible and/or soluble material is put into the cup-shaped membrane or textile and is in the contact with aforesaid wires or stick at the same time.

The overall shape of the implant may be not only cylindrical but also elliptical, rectangular, etc.

The implant is characterized by one very thin wall at the side which is surgically fixed to the surface of the affected tissue, while other walls of the implant are considerably thicker. Since the rate of diffusion decreases aproximately with second power of the wall thickness, the diffusion is practically unidirectional already at the ten-fold difference in the wall thickness and only 1% of the agent penetrates through the thick walls. The implant is connected to one or two thin tubes for inlet and outlet of the active substance. The content of the implant can be exchanged, in principle, by means of one tube only, if the implant is made of a highly elastic material which allows to suck off practically off solution from the chamber by applying underpressure. New solution of another concentration or composition can be injected into the implant or the replacement may be perfectly performed by repeated sucking off and injecting.

Implant may be prepared, according to the invention, which enable to maintain or arbitrarily change the rate of the introduced active substance, to interrupt the introduction temporarily, or to use different active substances in an arbitrary sequence by means of cannulas. These arrangements are very promising according to the recent experience in the therapy of malignant tumors.

Figure 2:
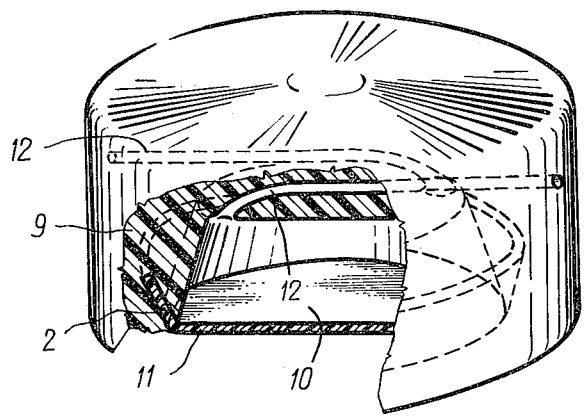

The invention is further illustrated in the Example by means of drawings, wherein FIG. 1 represents the section through the assembled mold for implantate preparation and FIG. 2 shows the implant thus produced.

The given Example does not limit the scope of the invention.

EXAMPLE

The mold shown in FIG. 1 consists of the vessel 4 closed by the detachable lid 8 provided by an opening. The cup-shaped membrane 2 is arranged at the bottom which is preferably formed by the glass carrier 1. The core 3 made from a fusible and/or soluble material has the required shape of the implant chamber and is placed into the membrane cup. The stainless-steel wires 5 are pushed through the walls of the vessel and are bent in such a way that they are in contact with the core 3 and are connected to the core in the place 7.

The diffusion membrane is prepared using a fine polyester or polyamide fabric or knitwork and polymerizing the monomer mixture on and within the fabric placed between two glass plates. Other fabrics or knitworks resistant at the physiologic condition may be also used. Polymere are chosen, for this purpose, allowing a sufficiently rapid diffusion of water-soluble substances, i.e. advantageously hydrophilic gels as are e.g. sparingly cross-linked polymers of glycol monoesters of methacrylic acid. The membrane can be readily cup-shaped 2 (FIG. 1) in the wet state by means of a cylindric matrix and then dried, or it can be dried and then shaped at the temperature above the softening point of the dry gel and the shape fixed by subsequent cooling. This cup is then stuck on the glass carrier 1 by its bottom plane surface by means of a drop of molten paraffin. The paraffin core 3 having the required shape of the implant chamber 10 is put inside the cup and attached to the whole inside surface of the cup 2 by a short heating of the glass carrier and moderate pressing. The sealing ring 4 is then placed onto the glass carrier 1 and fixed in the concentric position along its circumference 6 with paraffin. The stainless-steel wires 5 are introduced into approximately radial and parallely leading holes in the ring 4 and are bent so as to be just in contact with the paraffin core 3. The wires are then welded to the core in position 7 by a short touch of a hot rod. The mold is sealed with the plastic lid 8 and the solution of monomer is poured into the opening in the middle of the lid.

It is of advantage to employ such monomer solutions, which copy accurately the original size of mold after polymerization and equilibration with the physiologic saline. This can be achieved e.g. with the mixture which consists of 60 parts of ethyleneglycol monomethacrylate containing 0.25% of ethyleneglycol dimethacrylate, 20 parts of 0.25% aqueous solution of sodium persulfate and 20 parts of 0.25% solution of sodium disulfite in 25% aqueous ethanol. This mixture polymerizes spontaneously already at 30° C in such a way that after 30 minutes the temperature can be increased above the melting point of paraffin, the mold dismantled into single parts and the crude casting removed. To finish the implant, the casting is mechanically worked in dry state, i.e. the riser and overflows are removed and the edges are rounded off. After reswelling into equilibrium in the physiologic saline the implant has the final shape shown in FIG. 2. The liquid in the chamber 10 in the main thick-walled body 9 wets the diffusion membrane 11, which is anchored in the implant body 9 by its edges. The channels 12 lead into the chamber and serve for connecting with cannulas.

If the material of the membrane and of the implant body is the same, simplified procedure may be used consisting in filling up of the textile reinforcement of membrane and the mold with the monomer mixture at the same time. In this way the textile material itself is preshaped into the corresponding cup form by ironing, inserted into the mold and pressed to the mold bottom by the fusible and/or soluble core 3. Further procedure is identical with the procedure illustrated in FIG. 1.

The basic shape may be modified in various ways. Thus, only one channel can be formed instead of two, as it has been mentioned above. In the implant of larger size the position of the wide membrane may be secured by supporting columns obtained by a simple modification. The columns are formed when one or more holes are drilled in the paraffin core which represents the space of the implantate cavity. Thick fabric may be built into the thick-walled parts of the implant and thus the diffusion in the undesirable directions can be further decreased.

It is also possible to apply a textile ply, e.g. a coiled cord or strip of fabric, to the circumference of the implant, which may serve for a safe surgical fixation.

The hydrophilic gels may be advantageously used as the fundamental polymer for membrane as well as for the implant body, with respect to their excellent physiological tolerance. However, the application of other materials for the implant body is not excluded. For instance, poly(methyl methacrylate), silicone or polyurethane rubbers can be used. In this case another auxiliary material which is insoluble in these monomers has to be used for formation of the implant cavity, thus e.g. the cores from molten inorganic salts, respectively another commonly known technique has to be used.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An implant for the infusion of efficient substances comprising a hollow body formed of a physiologically inert elastic hydrophilic material, said body being formed of a cupped portion comprising a continuous substantially impermeable thick wall defining an interior chamber for receipt and storage of said substance and an opening, a permeable membrane integrally secured to said body and covering said opening to enclose said chamber, said membrane permitting directed diffusion of said substance stored within said chamber outwardly of said opening and at least one channel extending through said thick wall portion from said interior chamber to the outside of said body for access to said interior chamber for supplying said substance to said chamber.

2. The implant according to claim 1 wherein the inert material is a sparingly cross-linked polymer with the linear swelling capacity in the range from 10 to 45 percent.

3. The implant according to claim 1, wherein the hydrophilic material is a copolymer of glycol methacrylate or acrylate, respectively, containing up to 2 weight percent of glycol dimethacrylate or acrylate, respectively, and up to 3 weight percent of free methacrylic or acrylic acid, respectively.

4. The implant according to claim 1, wherein the membrane is reinforced with textile.

5. The implant according to claim 1 wherein the membrane is formed from a material different from the implant body.

6. The implant according to claim 1 wherein the body is cup shaped, and wherein the rim of said cup shaped body is formed with a groove and the edges of said membrane are anchored therein.

7. The implant according to claim 1 wherein said body is reinforced with an inner core of hydrophobic material.

8. A body implant device for delivery of a medicament over a long period of time comprising a chamber adapted to receive a medicament, body wall means sufficiently thick to be resistant to fluid flow therethrough partially surrounding said chamber, relatively thin fluid permeable membrane means engaging said wall means and completing the surrounding of said chamber, said membrane means permitting transport of fluids between the body and said chamber, said membrane means being not over one-half the thickness of said wall means, said wall means and said membrane means being made of a water insoluble hydrophilic non toxic biocompatible polymer of a hydroxy lower alkyl acrylate or methacrylate, first conduit means for feeding medicament to said chamber and second conduit means for rapid removal of medicament from said chamber.

9. A body implant device according to claim 8 including a medicament.

10. A body implant device according to claim 8 wherein said first and second conduit means both pass through said wall means to said chamber.

11. A body implant device according to claim 8 having a single membrane means.

12. A body implant device according to claim 8 having a plurality of spaced apart membrane means.

13. A body implant device according to claim 8 wherein the hydroxy lower alkyl acrylate or methacrylate is hydroxyethyl methacrylate.

14. A body implant device for delivery of a medicament over a long period of time comprising a chamber adopted to receive a medicament, body wall means sufficiently thick to be resistant to fluid flow therethrough at least partially surrounding said chamber, relatively thin fluid permeable membrane means engaging said wall means and completely surrounding both said chamber and said wall means, said membrane means permitting transport of fluids between the body and said chamber, said membrane means being not over one-half the thickness of said wall means, said wall means and said membrane means being made of a biologically incompatible material and an extremely thin coating of a water insoluble hydrophilic non toxic, biocompatible polymer of a hydroxy lower alkyl acrylate or methacrylate surrounding all externally exposed portions of said wall means and said membrane means, said coating being sufficiently thin that it does not interfere with fluid transport through said membrane means, a first conduit means for feeding medicament to said chamber and a second conduit means for rapid removal of medicament from said chamber.

15. A body implant device according to claim 14 including a medicament.

16. A body implant device according to claim 14 wherein said first and second conduit means both pass through said wall means to said chamber.

17. A body implant device according to claim 14 wherein said wall means partially surrounds said chamber and said membrane means completes the surrounding of said chamber.

18. A body implant device according to claim 17 having a single membrane means.

19. A body implant device according to claim 14 wherein the hydroxy lower alkyl acrylate or methacrylate is hydroxyethyl methacrylate.

20. A body implant device for delivery of a medicament over a long period of time comprising a chamber adapted to receive a medicament, body wall means sufficiently thick to be resistant to fluid flow therethrough partially surrounding said chamber, relatively thin fluid permeable membrane means engaging said wall means and completing the surrounding of said chamber, said membrane means permitting transport of fluids between the body and said chamber, said membrane means being not over one-half the thickness of said wall means, said wall means and said membrane means being made of a water insoluble hydrophilic non toxic polymer of a member of the group consisting of hydroxy lower alkyl acrylates, hydroxy lower alkyl methacrylates, hydroxy lower alkoxy lower alkyl acrylates, hydroxy lower alkoxy lower alkyl methacrylates, vinyl pyrrolidone, acrylamide, methacrylamide, N-lower alkyl acrylamide, N-lower alkyl methacrylamide N-hydroxy lower alkyl acrylamide and N-hydroxy lower alkyl methacrylamide first conduit means for feeding medicament to said chamber and second conduit means for rapid removal of medicament from said chamber.

21. A body implant device according to claim 20 including a medicament.

22. A body implant device according to claim 20 wherein said first and second conduit means both pass through said wall means to said chamber.

23. A body implant device according to claim 20 having a single membrane means.

24. A body implant device according to claim 23 wherein the wall means and the membrane means are made of a member of the group consisting of hydroxy lower alkyl acrylates and hydroxy lower alkyl methacrylates.

25. A body implant device according to claim 24 wherein the wall means and the membrane means are made of hydroxy-ethyl methacrylate.

26. A body implant device for delivery of a medicament over a long period of time comprising a chamber adopted to receive a medicament, body wall means sufficiently thick to be resistant to fluid flow therethrough at least partially surrounding said chamber, relatively thin fluid permeable membrane means engaging said wall means and completing the surrounding of said chamber, said membrane means permitting transport of fluids between the body and said chamber, said membrane means being not over one-half the thickness of said wall means, said wall means and said membrane means being made of a biologically incompatible material and an extremely thin coating of a water insoluble hydrophilic non toxic, biocompatible polymer of a member of the group consisting of hydroxy lower alkyl acrylates, hydroxy lower alkyl methacrylates, hydroxy lower alkoxy lower alkyl acrylates, hydroxy lower alkoxy lower alkyl methacrylates, vinyl pyrrolidone, acrylamide, methacrylamide, N-lower alkyl acrylamide, N-lower alkyl methacrylamide, N-hydroxy lower alkyl acrylamide and N-hydroxy lower alkyl methacrylamide surrounding all externally exposed portions of said wall means and said membrane means, said coating being sufficiently thin that it does not interfere with fluid transport through said membrane means, a first conduit means for feeding medicament to said chamber and a second conduit means for rapid removal of medicament from said chamber.

27. A body implant device according to claim 26 including a medicament.

28. A body implant device according to claim 26 wherein said membrane means completely surrounds said wall means.

29. A body implant device according to claim 26 wherein said wall means partially surrounds said chamber and said membrane means completes the surrounding of said chamber.

30. A body implant device according to claim 29 having a single membrane means.

\* \* \* \* \*